(12) United States Patent
Huang et al.

(10) Patent No.: US 10,921,932 B1
(45) Date of Patent: Feb. 16, 2021

(54) ADAPTIVE TOUCH PANEL SYSTEM AND AN ADAPTIVE METHOD THEREOF ADAPTED TO ENVIRONMENTAL CHANGE

(71) Applicant: Wistron Corporation, New Taipei (TW)

(72) Inventors: Kung-Chieh Huang, New Taipei (TW); Shao-Ping Lo, New Taipei (TW); Chen-Feng Chan, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/561,041

(22) Filed: Sep. 5, 2019

(30) Foreign Application Priority Data

Jul. 30, 2019 (TW) .............................. 108127080 A

(51) Int. Cl.
  *G06F 3/041* (2006.01)
  *G06F 3/044* (2006.01)
(52) U.S. Cl.
  CPC .......... *G06F 3/04166* (2019.05); *G06F 3/044* (2013.01); *G06F 3/0418* (2013.01); *G06F 2203/04104* (2013.01); *G06F 2203/04114* (2019.05)
(58) Field of Classification Search
  CPC . G06F 2203/04102; G06F 2203/04105; G06F 3/041; G06F 3/0418
  See application file for complete search history.

(56) References Cited

U.S. PATENT DOCUMENTS

| 8,648,834 | B2 | 2/2014 | Wong et al. |
| 2008/0158185 | A1* | 7/2008 | Westerman ............ G06F 3/0421 345/173 |
| 2012/0293444 | A1 | 11/2012 | Wong et al. |

(Continued)

FOREIGN PATENT DOCUMENTS

| TW | 201248482 | 12/2012 |
| TW | 201433948 | 9/2014 |

(Continued)

OTHER PUBLICATIONS

"Office Action of Taiwan Counterpart Application", dated Jun. 8, 2020, p. 1-p. 10.

*Primary Examiner* — Chun-Nan Lin
(74) *Attorney, Agent, or Firm* — JCIPRNET

(57) ABSTRACT

An adaptive touch panel system and an adaptive method thereof are provided. The adaptive touch panel system includes a touch panel and an environment sensing device. The touch panel includes a touch sensor and a control device. The touch sensor senses a touch event and correspondingly outputs touch raw data. The control device includes a plurality of setting modes. The plurality of setting modes include a general setting mode and at least one special setting mode. The environment sensing device senses a current operating environment of the touch panel and generates at least one environmental physical parameter. The control device is configured to correspondingly select one of the plurality of setting modes according to the at least one environmental physical parameter, set the touch sensor according to the selected setting mode, and analyze the touch raw data to generate touch data.

20 Claims, 4 Drawing Sheets

(56) References Cited

U.S. PATENT DOCUMENTS

| | | | | |
|---|---|---|---|---|
| 2014/0132558 A1* | 5/2014 | Jang | ............................ | G06F 3/05 |
| | | | | 345/174 |
| 2014/0232681 A1* | 8/2014 | Yeh | .......................... | G06F 3/044 |
| | | | | 345/174 |
| 2015/0212621 A1* | 7/2015 | Pan | ........................ | G06F 3/0418 |
| | | | | 345/174 |
| 2017/0235425 A1* | 8/2017 | Chen | ...................... | G06F 3/0425 |
| | | | | 345/175 |

FOREIGN PATENT DOCUMENTS

| | | |
|---|---|---|
| TW | 201530419 | 8/2015 |
| TW | I533170 | 5/2016 |

\* cited by examiner

ADAPTIVE TOUCH PANEL SYSTEM AND AN ADAPTIVE METHOD THEREOF ADAPTED TO ENVIRONMENTAL CHANGE

CROSS-REFERENCE TO RELATED APPLICATION

This application claims the priority benefit of Taiwan application serial no. 108127080, filed on Jul. 30, 2019. The entirety of the above-mentioned patent application is hereby incorporated by reference herein and made a part of this specification.

BACKGROUND

Field of the Invention

The present invention generally relates to a touch panel system, in particular, to a touch panel system adapted to an environmental change and an adaptive method thereof.

Description of Related Art

Along with improvement, development and cost reduction of touch technologies, touch panels have been quite popularized and usually integrated into various electronic products such that users may intuitively control and operate the electronic products. Existing common touch panels include capacitive touch panels, resistive touch panels and optical touch panels. For example, in a capacitive touch panel, since a position of a touch point is determined by sensing a change in micro-capacitance, its touch performance is easily affected by the environment. For example, when there are obvious radio frequency (RF) noises in an operating environment of the touch panel, a signal-to-noise ratio (SNR) of the touch panel may be decreased. Or, when an environmental temperature of the operating environment of the touch panel is excessively high or excessively low, noises may easily occur in the touch panel to cause poor touch quality. Or, when there is liquid (for example, water) on a surface of the touch panel, since the liquid is conductive, the touch panel is likely to falsely report a touch point. One of conventional solutions is to increase a sensing threshold, but the sensitivity may be decreased to bring troubles in use. Or, a user adapts the touch panel to different operating environments by manually adjusting setting values, but the user may have to rely on their own judgment and make numerous attempts in order to adjust the touch panel to a proper setting. In view of this, solutions of embodiments will be proposed below in the present invention.

SUMMARY

The present invention provides an adaptive touch panel system and an adaptive method thereof, in which a setting of a touch panel can be automatically and correspondingly adjusted according to an environmental change.

According to an embodiment of the present invention, an adaptive touch panel system of the present invention includes a touch panel and an environment sensing device. The touch panel includes a touch sensor and a control device. The touch sensor is configured to sense a touch event and correspondingly output touch raw data. The control device is electrically coupled to the touch sensor. The control device includes a plurality of setting modes. The plurality of setting modes include a general setting mode and at least one special setting mode. The environment sensing device is electrically coupled to the control device. The environment sensing device is configured to sense a current operating environment of the touch panel and generate at least one environmental physical parameter. The control device is configured to correspondingly select one of the plurality of setting modes according to the at least one environmental physical parameter, set the touch sensor according to the selected setting mode, and analyze the touch raw data to generate touch data.

According to an embodiment of the present invention, an adaptive method for a touch panel system of the present invention is applied to setting of a touch panel system with a touch sensor. The adaptive method includes the following steps: at least one environmental physical parameter is obtained through an environment sensing device; one of a plurality of setting modes is correspondingly selected according to the at least one environmental physical parameter, and the touch sensor is set according to one of the plurality of setting modes, the plurality of setting modes including a general setting mode and at least one special setting mode; touch raw data is obtained through the touch sensor; and the touch raw data is analyzed according to one of the plurality of setting modes to generate touch data.

Based on the aforementioned embodiments, according to the adaptive touch panel system and adaptive method thereof of the present invention, the at least one environmental physical parameter of the current operating environment of the touch panel can be automatically sensed to automatically and correspondingly adjust a setting of the touch panel, so that the touch panel can provide a good touch function in various operating environments.

In order to make the aforementioned features and advantages of the present invention comprehensible, embodiments accompanied with figures are described in detail below.

DESCRIPTION OF THE EMBODIMENTS

Figure 1:
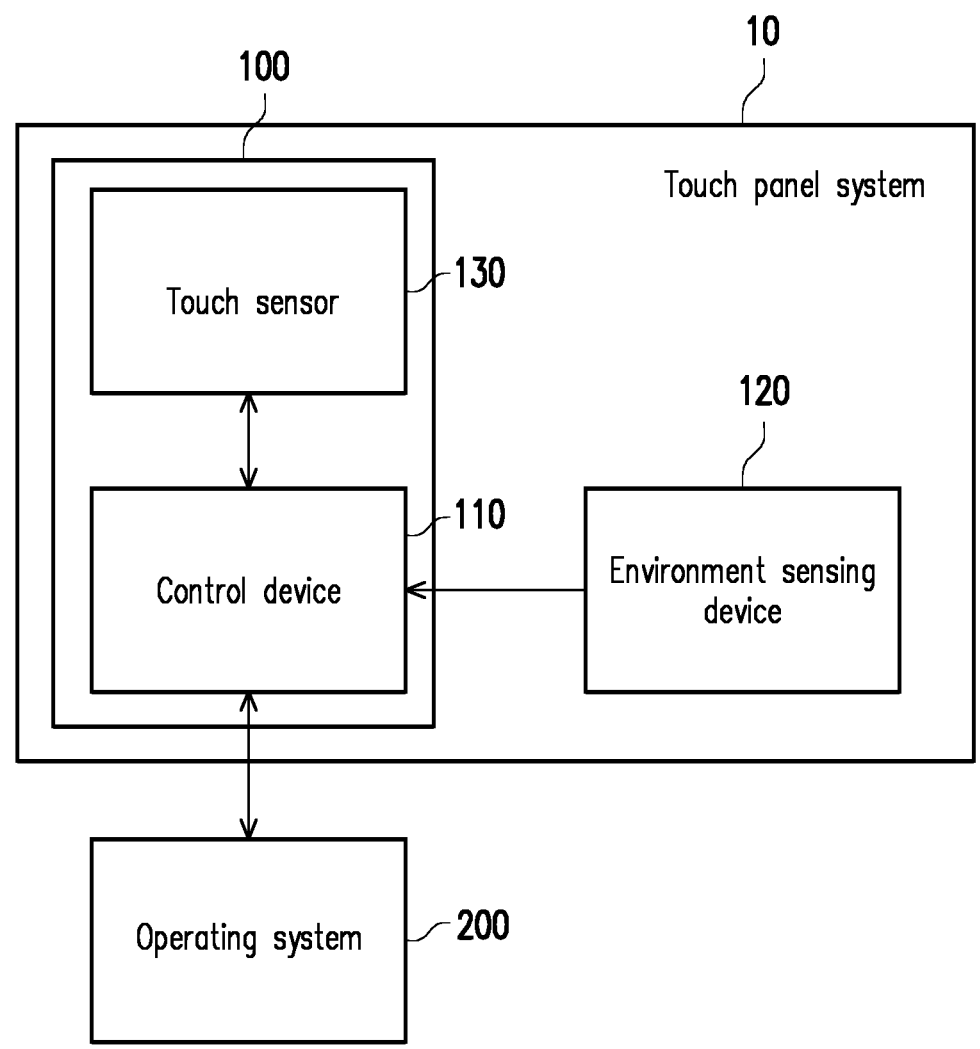
FIG. 1 is a schematic block diagram of an adaptive touch panel system according to an embodiment of the present invention.

In order to make the content of the present invention more comprehensible, embodiments are described below to explain the present invention. However, the present invention is not limited to the embodiments. The embodiments can also be combined properly. Wherever possible, the same reference numerals are used in the drawings and the description to refer to the same or like parts, components or steps.

FIG. 1 is a schematic block diagram of an adaptive touch panel system according to an embodiment of the present invention. Referring to FIG. 1, a touch panel system 10 basically includes a touch panel 100 and an environment sensing device 120. The touch panel 100 further includes a control device 110 and a touch sensor 130. The control device 110 is coupled to the environment sensing device 120 and the touch sensor 130, and may further be electrically coupled to an operating system (OS) 200 of an electronic device. In the present embodiment, the control device 110 may sense, through the environment sensing device 120, an environmental physical parameter of a current operating environment to automatically adjust a related setting of the touch sensor 130 and turn on a related auxiliary analysis function to automatically adapt the touch panel 100 to various operating environments. Therefore, the touch sensor 130, after sensing a touch object, may output touch raw data to the control device 110 for the control device 110 to analyze the touch raw data and convert the touch raw data into corresponding touch data. In the present embodiment, the touch raw data may include information such as a touch signal intensity and a touch signal distribution, and the touch data may include an identification code and coordinates of a touch point.

In the present embodiment, the control device 110 of the touch panel 100 may output the touch data to the OS 200 of the electronic device or receive a related control signal from the OS 200 of the electronic device. In the present embodiment, the electronic device equipped with the OS 200 may be, for example, a computer host, a handheld device, a wearable device or an electronic system with a specific function. It is to be noted that the touch panel 100 of the present embodiment may be configured to provide an automatic setting function and may be combined with any adaptive external OS 200 and thus a type of the OS 200 is not limited in the present embodiment.

In the present embodiment, the control device 110 may refer to or include a circuit (for example, an integrated circuit (IC)) and/or firmware pre-writing a plurality of setting modes into a flash memory or a programmable read-only memory (PROM). Moreover, the environment sensing device 120 may include, for example, an RF sensor, a temperature sensor, a liquid sensor and the like mounted on the touch panel 100 or the electronic device, and is configured to sense the current operating environment, so as to obtain at least one environmental physical parameter. Therefore, the control device 110 may determine to select and execute one of the plurality of pre-written setting modes according to the at least one environmental physical parameter.

However, in an embodiment, the control device 110 may also transmit the at least one environmental physical parameter to the OS 200 for the OS 200 to analyze the at least one environmental physical parameter, and the OS 200 may return a corresponding control signal to the control device 110. Therefore, the control device 110 may determine to execute one of the plurality of setting modes according to the corresponding control signal returned by the OS 200. In other words, analysis of the environmental physical parameter may be executed by the external OS 200, so as to reduce arithmetic capability requirements for the control device 110. Therefore, in an embodiment of the present invention, the control device may also generically or broadly include an OS.

In addition, the touch sensor 130 of the present embodiment may include a touch sensing array, and the touch sensor 130 of the present embodiment may be a capacitive touch sensor. However, the present invention is not limited thereto. In an embodiment, the touch sensor 130 may also be a resistive touch sensor, an optical touch sensor or an inductive touch sensor, etc.

Figure 2:
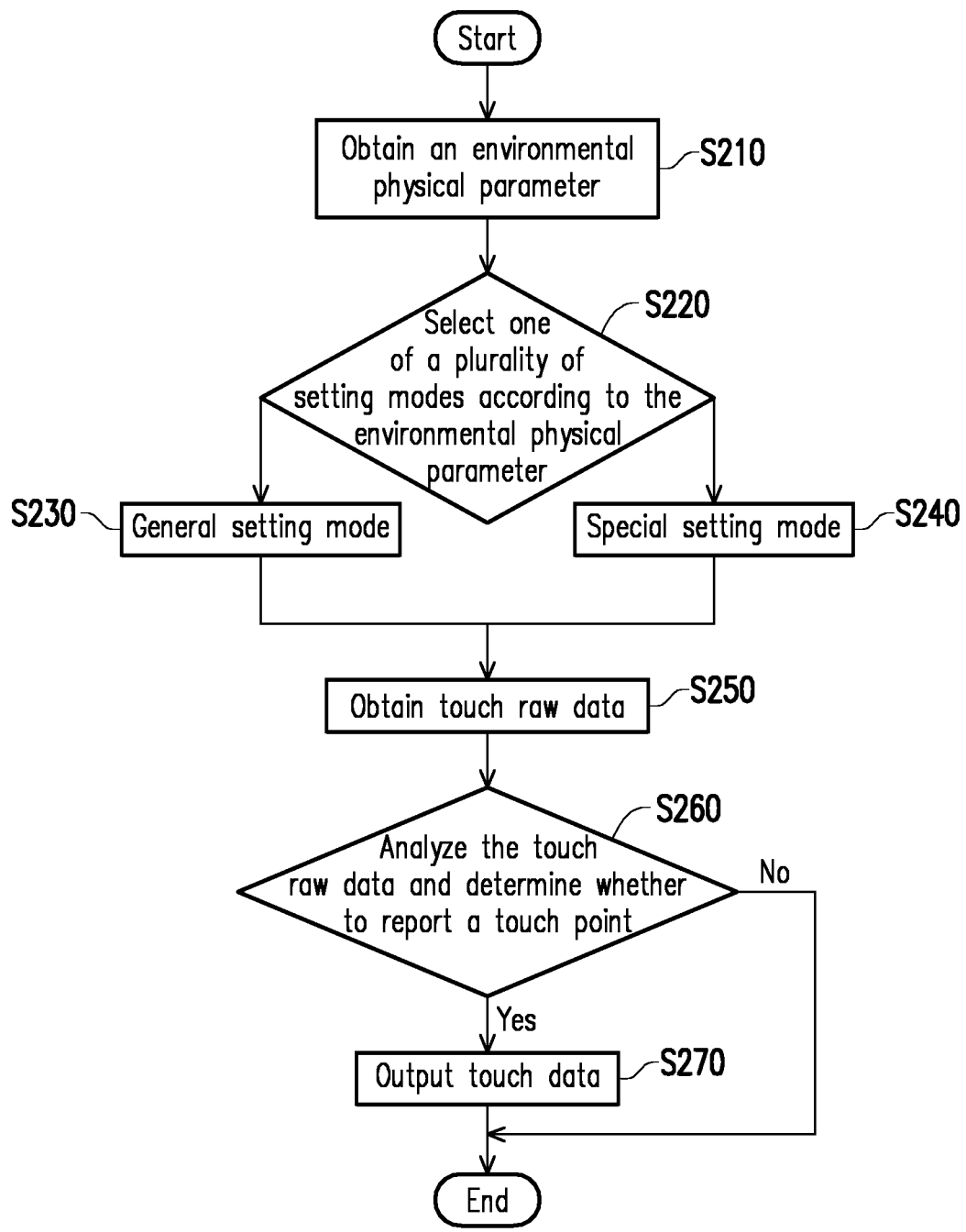
FIG. 2 is a flowchart of an adaptive method according to an embodiment of the present invention.

FIG. 2 is a flowchart of an adaptive method according to an embodiment of the present invention. Referring to FIG. 1 and FIG. 2, the adaptive method of the present embodiment may at least be applied to the touch panel system 10 of the embodiment shown in FIG. 1, so as to enable the touch panel 100 to implement the following steps S210 to S270. In step S210, the environment sensing device 120 senses a current operating environment of the touch panel 100, so as to obtain an environmental physical parameter. In step S220, the control device 110 selects one of a plurality of setting modes according to the environmental physical parameter. For example, the environment sensing device 120 may include, for example, an RF sensor, and the environmental physical parameter may be, for example, an RF noise. If the control device 110 determines that the RF noise of the touch panel 100 in the current operating environment is relatively low, the control device 110 may automatically select to execute step S230 to operate the touch panel 100 in a general setting mode. By contrast, if the control device 110 determines that the RF noise of the touch panel 100 in the current operating environment is excessively high, the control device 110 may automatically select to execute step S240 to operate the touch panel 100 in a special setting mode.

In other words, if the RF noise in the current operating environment is excessively high, the control device 110 may automatically adjust a setting of the touch sensor 130 and turn on a related auxiliary analysis function such that the touch panel 100 may be effectively adapted to the current operating environment with the excessively high RF noise to avoid a decrease of an SNR of the touch panel 100. However, the environmental physical parameter of the present embodiment is not limited to the RF noise. The environmental physical parameter of the present embodiment may also be a temperature parameter or a conductivity parameter, etc. For example, in an embodiment, the control device 110 may determine whether a temperature of the current operating environment is excessively high or excessively low according to a currently sensed temperature parameter, so as to correspondingly adjust the setting of the touch panel 100. In another embodiment, the control device 110 may also determine whether there is liquid in a touch region of the touch panel 100 in the current operating environment according to a conductivity parameter sensed on a surface of the touch panel, so as to correspondingly adjust the setting of the touch panel 100. For example, if there is water in the touch region of the touch panel 100, the conductivity parameter is not 0.

In step S250, after setting of the touch panel 100 is completed, the touch panel 100 obtains, through the touch sensor 130, touch raw data of a current touch event. In step S260, the control device 110 analyzes the touch raw data to obtain touch data, and determines whether to report a touch point. If YES, the control device 110 executes step S270 to output the touch data to the OS 200. If NO, the control device 110 ends the current determination flow. However, in an embodiment, after the control device 110 stops executing step S260 or step S270, the control device 110 may re-execute step S250 to obtain new touch raw data. In another embodiment, after the control device 110 stops executing step S260 or step S270, the control device 110 may also determine whether the current determination has lasted for more than a preset time length, so as to re-execute step S210 to enable the touch panel 100 to automatically adjust the setting thereof in real time according to the operating environment. Therefore, according to the adaptive method of the present embodiment, the touch panel 100 may realize an automatic setting adjustment function to be effectively adapted to various operating environments.

In addition, enough teachings, suggestions and implementation descriptions may be obtained for related element characteristics, technical details and implementation modes of the touch panel system 10 in the present embodiment with reference to the contents in the embodiment shown in FIG. 1, and thus elaborations are omitted herein.

Figure 3:
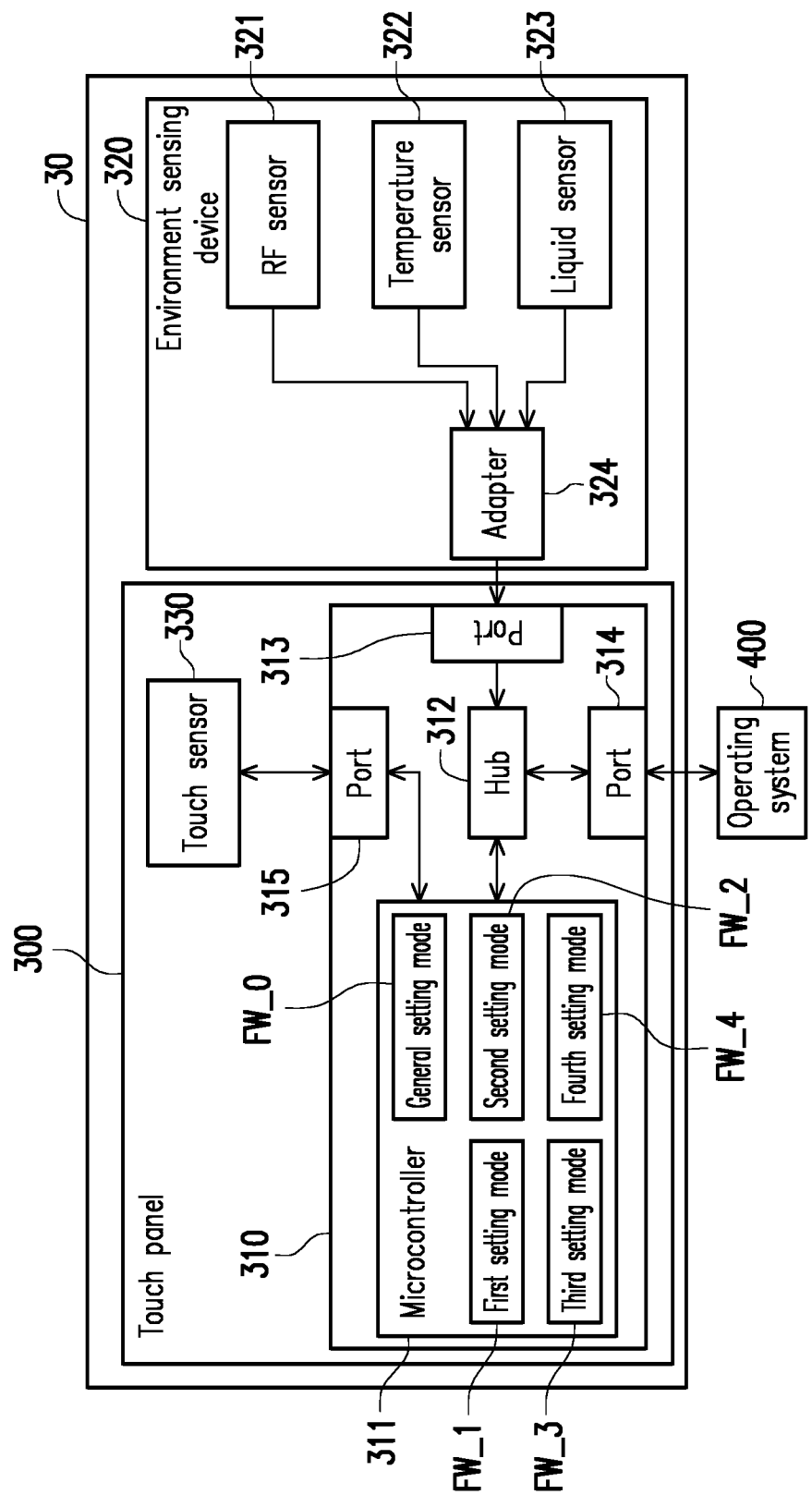
FIG. 3 is a schematic block diagram of an adaptive touch panel system according to another embodiment of the present invention.

FIG. 3 is a schematic block diagram of an adaptive touch panel system according to another embodiment of the present invention. The present embodiment may be considered as one of detailed embodiments of the aforementioned embodiment shown in FIG. 1. Referring to FIG. 3, a touch panel system 30 includes a touch panel 300 and an environment sensing device 320. The touch panel 300 includes a control device 310 and a touch sensor 330. The control device 310 is electrically coupled to the environment sensing device 320 and the touch sensor 330. In the present embodiment, the environment sensing device 320 includes an RF sensor 321, a temperature sensor 322 and a liquid sensor 323. In other embodiments of the present invention, the environment sensing device 320 may also include only one or two of the RF sensor 321, the temperature sensor 322 and the liquid sensor 323, or may further include an environment sensor of another type. The RF sensor 321 may be, for example, an RF antenna, and is configured to sense an RF noise in an environment where the touch panel 300 is located. The temperature sensor 322 may be, for example, a thermistor, and is configured to sense a temperature of the environment where the touch panel 300 is located. The liquid sensor 323 may be implemented, for example, by arranging two electrodes in the vicinity of a touch region on a panel surface of the touch panel 300, so as to determine whether there is liquid in the touch region on the panel surface of the touch panel 300 according to whether the two electrodes are conductive. For example, if there is water between the two electrodes, the two electrodes are conductive, and thus a conductivity parameter sensed by the liquid sensor 323 is not 0.

In the present embodiment, the environment sensing device 320 may include an adapter 324 electrically coupled between the control device 310 and each sensor and configured to receive a plurality of environmental physical parameters provided by each sensor and convert a signal format or form a command. In the present embodiment, the control device 310 includes a microcontroller 311, a hub 312 and ports 313 to 315. In the present embodiment, the port 313 is electrically coupled between the adapter 324 and the hub 312, and the port 314 is electrically coupled between an OS 400 and the hub 312. In the present embodiment, the port 315 is coupled between the touch sensor 330 and the microcontroller 311. In addition, in an embodiment, the control device 310 may be, for example, a control circuit board, and the microcontroller 311, the hub 312, the ports 313 to 315 and a related circuit may be integrated into the circuit board.

In the present embodiment, the port 315 may be, for example, a serial peripheral interface (SPI) bus, and the ports 313 and 314 may be, for example, universal serial buses (USBs). However, the port 315 and the ports 313 and 314 are not limited thereto. The hub 312 may be, for example, a USB hub, and the hub 312 is configured to transmit a related signal or data output by the adapter 324 to the microcontroller 311 in a time-sharing manner and transmit touch data generated by the microcontroller 311 to the external OS 400. In an embodiment, the hub 312 may also be configured to transmit a related signal or data provided by the external OS 400 to the microcontroller 311.

Specifically, the adapter 324 may collect the RF noises, temperature parameters and conductivity parameters obtained by sensing the current operating environment by the RF sensor 321, the temperature sensor 322 and the liquid sensor 323 respectively. In the present embodiment, the adapter 324 may include another microcontroller configured to analyze the RF noise, the temperature parameter and the conductivity parameter, and correspondingly outputs a control signal to the control device 310 according to an analysis result of each environmental parameter, the control signal being transmitted to the microcontroller 311 through the port 313 and the hub 312. In other words, the microcontroller 311 may determine whether to execute a general setting mode or select one of firmware FW_1 to FW_4 for first to fourth setting modes according to the control signal provided by the adapter 324, and set the touch sensor 330 and turn on a related auxiliary analysis function for analyzing touch raw data. Then, the microcontroller 311 may receive the touch raw data provided by the touch sensor 330 from the port 315 and analyze the touch raw data to generate corresponding touch data.

However, in an embodiment, the adapter 324 may also transmit a plurality of environmental physical parameters provided by the environment sensing device 320 to the external OS 400 through the hub 312 or another line, and the external OS 400 may return a corresponding control signal to the microcontroller 311 through the hub 312. Moreover, in still another embodiment, the adapter 324 may also be integrated into the control device 310 or the control circuit board of the control device 310, without being limited to a block configuration manner in FIG. 3.

More specifically, the adapter 324 may sequentially analyze at least one of the RF noise, the temperature parameter and the conductivity parameter according to a preset determination sequence, and when it is determined at first that one of the RF noise, the temperature parameter and the conductivity parameter is abnormal, the adapter 324 outputs a corresponding control signal to the microcontroller 311 for the microcontroller 311 to select and execute one of firmware FW_0 to FW_4 for the general setting mode or the first to fourth setting modes. In such a case, reference can be made to Table 1 below for setting details about the general setting mode and the first to fourth setting modes.

TABLE 1

| Mode type Operating environment | General setting mode | | First setting mode RF noise is excessively high | Second setting mode Environmental temperature is excessively high | Third setting mode Environmental temperature is excessively low | Fourth setting mode Liquid is on the panel |
|---|---|---|---|---|---|---|
| | Finger | Stylus/glove | | | | |
| Touch sensitivity | Normal | High | Low | Low | Highest | Low |
| First auxiliary analysis function | On | On | On | On | On | Off |
| Second auxiliary analysis function | Off | Off | Off | Off | Off | On |
| Third auxiliary | Off | Off | Off | Off | Off | On |

TABLE 1-continued

| Mode type Operating environment | General setting mode | | First setting mode RF noise is excessively high | Second setting mode Environmental temperature is excessively high | Third setting mode Environmental temperature is excessively low | Fourth setting mode Liquid is on the panel |
|---|---|---|---|---|---|---|
| | Finger | Stylus/glove | | | | |
| analysis function Single-point/multipoint touch | Multipoint | Multipoint | Multipoint | Multipoint | Multipoint | Single-point |
| Scanning frequency adjustment | Off | Off | On | Off | Off | Off |

In Table 1, a degree of "touch sensitivity" is inversely related to a magnitude of a threshold value set for touch point reporting of the microcontroller 311. In a process of reading a touch signal intensity in the touch raw data, the microcontroller 311 may determine whether the touch signal intensity exceeds the threshold value for touch point reporting to determine whether to output the corresponding touch data. If the threshold value is set to be relatively high, it is indicated that the touch sensitivity is low, and if the threshold value is set to be relatively low, it is indicated that the touch sensitivity is high. Therefore, in an operating environment where the RF noise is excessively high, the environmental temperature is excessively high and there is liquid on the panel, the microcontroller 311 may decrease the touch sensitivity (increasing the threshold value for touch point reporting). By contrast, in an operating environment where the environmental temperature is excessively low, the microcontroller 311 may adjust the touch sensitivity to the highest (decreasing the threshold value for touch point reporting). In addition, in the "general setting mode" in Table 1, the microcontroller 311 may also determine the touch sensitivity according to a type of a current touch object. In such a case, if the current touch object is a finger, the microcontroller 311 may keep the touch sensitivity normal. By contrast, if the current touch object is a stylus/glove, the microcontroller 311 may adjust the touch sensitivity.

In Table 1, the "first auxiliary analysis function" refers to that, in a touch raw data analysis process of the microcontroller 311, the microcontroller 311 may filter a portion where a touch signal distribution is a continuous large-area distribution and not report a touch point in the portion where the touch signal distribution is a continuous large-area distribution. Therefore, by the "first auxiliary analysis function", the case where a user's palm accidentally touches the touch region can be effectively excluded, and the microcontroller 311 can be effectively prevented from falsely reading touch data of the user's palm.

In Table 1, the "second auxiliary analysis function" refers to that, in the touch raw data analysis process of the microcontroller 311, the microcontroller 311 may determine whether the touch signal distribution of the touch raw data is a discrete distribution and whether an average value of a plurality of touch signal intensities is less than a signal intensity threshold value, so as to execute a third auxiliary analysis function. In other words, since a large-area touch signal distribution with a relatively low touch signal intensity is formed due to existence of the liquid on the panel of the touch sensor 330, it may temporally be determined by the "second auxiliary analysis function" that the large-area touch signal distribution with the relatively low touch signal intensity is formed by the liquid, and the third auxiliary analysis function is continued to be executed.

In Table 1, the "third auxiliary analysis function" refers to that the microcontroller 311, after the second auxiliary analysis function, continues determining whether a touch signal of the touch raw data has a negative value to stop touch point reporting. In other words, since capacitance of the panel of the touch sensor 330 may be increased by the liquid, whether a touch signal (capacitance) corresponding to the large-area touch signal distribution with the relatively low signal intensity has a positive value or a negative value may be determined by the "third auxiliary analysis function" to determine whether there is liquid, so as to effectively eliminate an accidental touch result caused by the liquid on the panel of the touch sensor 330.

In Table 1, "single-point/multipoint touch" refers to that, in the touch raw data analysis process of the microcontroller 311, the microcontroller 311 may only output an identification code and coordinates of a first touch point without outputting identification codes and coordinates of other touch points so as to implement single-point touch, or the microcontroller 311 may sequentially output identification codes and coordinates of a plurality of (for example, ten) touch points so as to implement multipoint touch.

In Table 1, "scanning frequency adjustment" refers to that the microcontroller 311 may set a scanning frequency of the touch sensor 330 for a plurality of sensing pulses transmitted by a transmitter (TX) and received by a receiver (RX) in a sensing process. For example, when a frequency of the RF noise in the operating environment right forms a multiple relationship with a frequency of the sensing pulses and a sensing result of the touch sensor 330 is consequently affected, the microcontroller 311 may switch the scanning frequency of the touch sensor 330 to avoid or reduce influence of the RF noise on the touch sensor 330.

Figure 4:
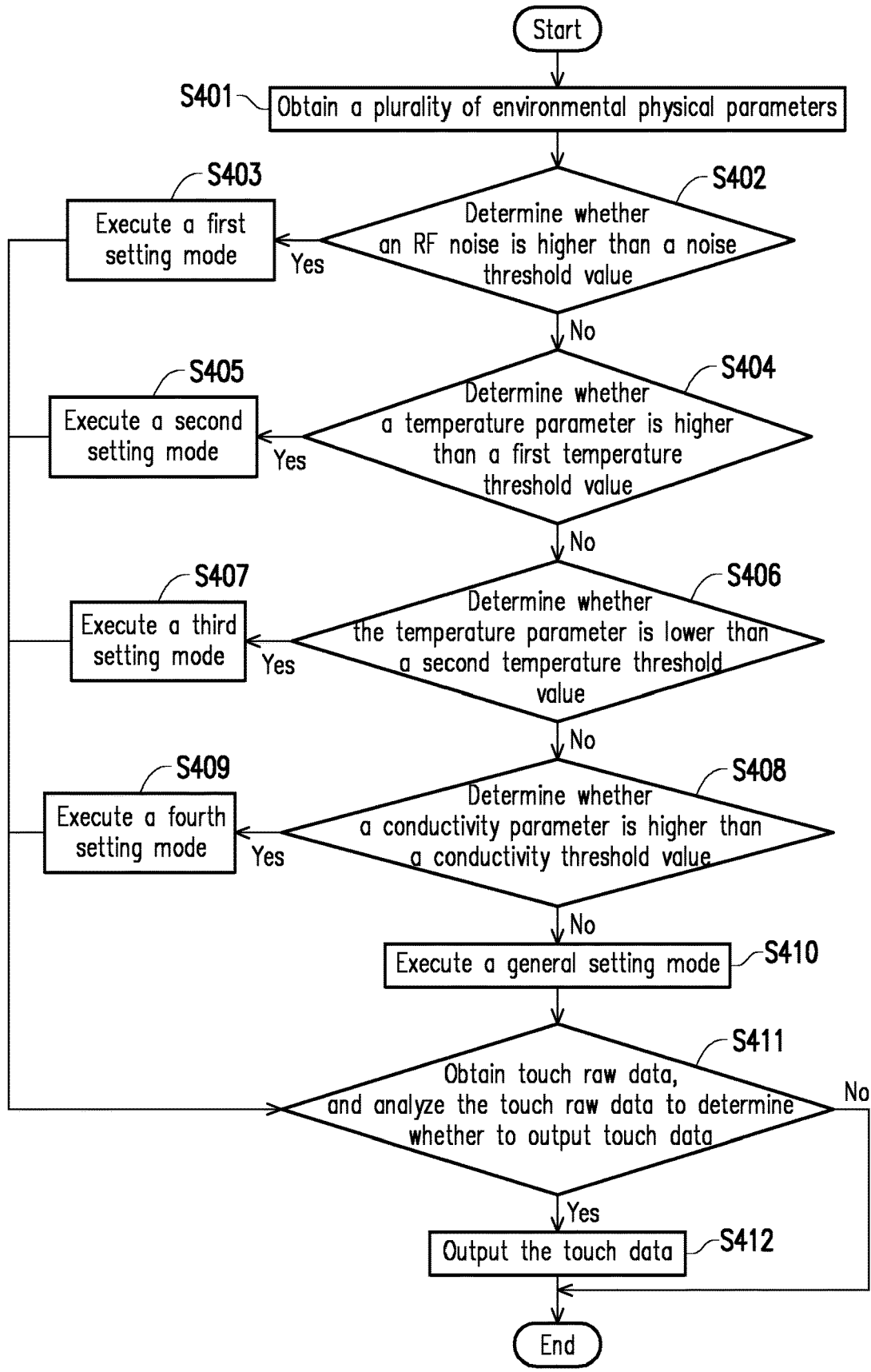
FIG. 4 is a flowchart of an adaptive method according to another embodiment of the present invention.

FIG. 4 is a flowchart of an adaptive method according to another embodiment of the present invention. The present embodiment may be considered as one of detailed method embodiments of the aforementioned embodiment shown in FIG. 2. Referring to FIG. 3 and FIG. 4, the adaptive method of the present embodiment may be applied to the touch panel system 30 of the embodiment shown in FIG. 3, and a determination sequence of environmental physical parameters is an RF noise, a temperature parameter and a conductivity parameter. However, the present invention is not limited thereto. In an embodiment, the touch panel system 30 may also analyze the environmental physical parameters according to a determination sequence different from that in FIG. 4. In another embodiment, the touch panel system 30 may determine only one or two of the RF noise, the temperature parameter and the conductivity parameter. In whichever embodiment, the touch panel system 30 may further determine another environmental physical parameter. In the present embodiment, the touch panel system 30 may implement the following steps S401 to S412.

In step S401, the environment sensing device 320 obtains, through the RF sensor 321, the temperature sensor 322 and the liquid sensor 323, a plurality of environmental physical parameters, for example, the RF noise, the temperature parameter and the conductivity parameter, respectively, and the environment sensing device 320 provides the plurality of environmental physical parameters for the adapter 324. In step S402, the adapter 324 determines whether the RF noise is higher than a noise threshold value, for example, 20 dB. If the adapter 324 determines that the RF noise is higher than the noise threshold value, it is indicated that the RF noise in a current operating environment is excessively high, and thus the adapter 324 outputs a control signal to the microcontroller 311 for the microcontroller 311 to read and execute the firmware FW_1 for the first setting mode. Then, step S411 is continued to be executed. By contrast, if the adapter 324 determines that the RF noise is not higher than the noise threshold value, the control device 310 executes step S404.

In step S404, the adapter 324 determines whether the temperature parameter is higher than a first temperature threshold value, for example, 40° C. If the adapter 324 determines that the temperature parameter is higher than the first temperature threshold value, it is indicated that a temperature of the current operating environment is excessively high, and thus the adapter 324 outputs a control signal to the microcontroller 311 for the microcontroller 311 to read and execute the firmware FW_2 for the second setting mode. Then, step S411 is continued to be executed. By contrast, if the adapter 324 determines that the temperature parameter is not higher than the first temperature threshold value, the control device 310 executes step S406.

In step S406, the adapter 324 determines whether the temperature parameter is lower than a second temperature threshold value, for example, −20° C. If the adapter 324 determines that the temperature parameter is lower than the second temperature threshold value, it is indicated that the temperature of the current operating environment is excessively low, and thus the adapter 324 outputs a control signal to the microcontroller 311 for the microcontroller 311 to read and execute the firmware FW_3 for the third setting mode. Then, step S411 is continued to be executed. By contrast, if the adapter 324 determines that the temperature parameter is not lower than the second temperature threshold value, the control device 310 executes step S408, the second temperature threshold value being lower than the first temperature threshold value.

In step S408, the adapter 324 determines whether the conductivity parameter is higher than a conductivity threshold value. If the adapter 324 determines that the conductivity parameter is higher than the conductivity threshold value, it is indicated that there is currently liquid on the panel of the touch sensor 330, and thus the adapter 324 outputs a control signal to the microcontroller 311 for the microcontroller 311 to read and execute the firmware FW_4 for the fourth setting mode. Then, step S411 is continued to be executed. By contrast, if the adapter 324 determines that the conductivity parameter is not higher than the conductivity threshold value, the control device 310 executes step S410. In step S410, the adapter 324 outputs a control signal to the microcontroller 311 for the microcontroller 311 to read and execute the firmware FW_0 for the general setting mode, and then step S411 is continued to be executed.

In step S411, the touch sensor 330 obtains touch raw data, and analyzes the touch raw data to determine whether to output touch data. In other words, in a determination process for the touch raw data in the general setting mode or one of the first to fourth setting modes, if the microcontroller 311 determines that touch point reporting is disallowed for the touch data, the microcontroller 311 does not output a currently determined touch result and ends the current determination flow. By contrast, if the microcontroller 311 determines that touch point reporting is not disallowed for the touch data, the microcontroller 311 outputs the touch data to the external OS 400 and ends the current determination flow.

However, in an embodiment, after the control device 310 stops executing step S411 or step S412, the control device 310 may re-execute step S401 to obtain, through the touch sensor 330, new touch raw data. In another embodiment, after the control device 310 stops executing step S411 or step S412, the control device 310 may also determine whether the current determination has lasted for more than a preset time length, so as to re-execute step S401 to enable the touch panel 300 to automatically adjust a setting thereof in real time according to the operating environment. Therefore, according to the adaptive method of the present embodiment, the touch panel 300 may realize an automatic setting adjustment function to be effectively adapted to various operating environments.

It is to be noted that, in an embodiment, the determination in steps S402, S404, S406 and S408 in FIG. 4 may also be executed by the microcontroller 311. Or, in another embodiment, the determination in steps S402, S404, S406 and S408 in FIG. 4 may also be executed by the OS 400. In addition, enough teachings, suggestions and implementation descriptions may be obtained for related element characteristics, technical details and implementation modes of the touch panel system 30 in the present embodiment with reference to the contents in the embodiment shown in FIG. 3, and thus elaborations are omitted herein.

Based on the above, according to the adaptive touch panel system and adaptive method thereof of the present invention, the at least one environmental physical parameter of the current operating environment of the touch panel may be sensed to automatically and correspondingly adjust the setting of the touch panel and turn on the related auxiliary analysis function, so as to improve the touch point reporting accuracy. Therefore, the touch panel of the present invention may provide relatively suitable touch functions in various operating environments.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An adaptive touch panel system, comprising:
   a touch panel, comprising:
     a touch sensor, configured to sense a touch event and correspondingly output touch raw data, and
     a controller, electrically coupled to the touch sensor and comprising a plurality of setting modes, the setting modes comprising a general setting mode and at least one special setting mode; and
   an environment sensor, electrically coupled to the controller and configured to sense a current operating environment of the touch panel and generate at least one environmental physical parameter,
   wherein the controller is configured to correspondingly select one of the setting modes according to the at least one environmental physical parameter, to set the touch sensor according to the selected setting mode, and to analyze the touch raw data to generate touch data according to the selected setting mode, wherein when the controller executes the selected special setting mode, the controller correspondingly adjusts a touch sensitivity of the touch sensor according to a result of comparison of the environmental physical parameter and a threshold value.

2. The adaptive touch panel system according to claim 1, wherein the at least one environmental physical parameter comprises at least one of a radio frequency (RF) noise, a temperature parameter and a conductivity parameter, and the controller analyzes at least one of the RF noise, the temperature parameter and the conductivity parameter to select and execute one of the setting modes.

3. The adaptive touch panel system according to claim 2, wherein, when the at least one environmental physical parameter comprises the RF noise and the controller determines that the RF noise is higher than a noise threshold value, the controller executes a first setting mode to decrease the touch sensitivity of the touch sensor.

4. The adaptive touch panel system according to claim 3, wherein the controller, when executing the first setting mode, further changes a scanning frequency of the touch sensor.

5. The adaptive touch panel system according to claim 2, wherein, when the at least one environmental physical parameter comprises the temperature parameter and the controller determines that the temperature parameter is higher than a first temperature threshold value, the controller executes a second setting mode to decrease the touch sensitivity of the touch sensor.

6. The adaptive touch panel system according to claim 2, wherein, when the at least one environmental physical parameter comprises the temperature parameter and the controller determines that the temperature parameter is lower than a second temperature threshold value, the controller executes a third setting mode to adjust the touch sensitivity of the touch sensor to the highest.

7. The adaptive touch panel system according to claim 2, wherein, when the at least one environmental physical parameter comprises the conductivity parameter and the controller determines that the conductivity parameter is higher than a conductivity threshold value, the controller executes a fourth setting mode to decrease the touch sensitivity of the touch sensor.

8. The adaptive touch panel system according to claim 7, wherein, in the fourth setting mode, the controller turns on a second auxiliary analysis function and a third auxiliary analysis function;

the second auxiliary analysis function is configured to determine whether a data distribution of a plurality of pieces of raw data in the touch raw data is a discrete distribution and whether an average value of the raw data is lower than a first threshold value to execute the third auxiliary analysis function; and the third auxiliary analysis function is configured to determine a positive/negative value of the raw data in the touch raw data to determine whether the controller stops touch point reporting.

9. The adaptive touch panel system according to claim 7, wherein, in the fourth setting mode, the controller controls the touch panel to provide a single-point touch function, wherein the single-point touch analysis function is configured to read first touch point data and a first touch point coordinate of the touch event when the controller analyzes the touch raw data.

10. The adaptive touch panel system according to claim 1, wherein the controller, when executing the selected special setting mode, further turns on a first auxiliary analysis function to filter a large-area touch signal distribution in the touch raw data, and controls the touch panel to provide a multipoint touch function.

11. The adaptive touch panel system according to claim 1, wherein, when the at least one environmental physical parameter does not exceed its corresponding threshold value or is not less than the corresponding threshold value, the controller executes the general setting mode, wherein the controller executes the general setting mode to keep normal or adjust the touch sensitivity of the touch sensor according to a type of a touch object corresponding to the touch event.

12. The adaptive touch panel system according to claim 11, wherein, in the general setting mode, the controller turns on a first auxiliary analysis function to filter large-area touch data in the touch raw data, and operates the touch panel to provide a multipoint touch function.

13. The adaptive touch panel system according to claim 11, wherein, when the touch object is a finger, the touch sensitivity of the touch sensor is kept normal, and when the touch object is a stylus or a glove, the touch sensitivity of the touch sensor is adjusted.

14. The adaptive touch panel system according to claim 1, wherein the environment sensor comprises at least one of an RF sensor, a temperature sensor and a liquid sensor, to correspondingly generate the RF noise, the temperature parameter and the conductivity parameter respectively.

15. The adaptive touch panel system according to claim 1, wherein the controller comprises:

a microcontroller, electrically coupled to the touch sensor and the environment sensor, wherein the microcontroller is configured to control the touch sensor, and comprises a plurality of pieces of firmware configured to record the corresponding setting modes.

16. The adaptive touch panel system according to claim 15, wherein the environment sensor further comprises:

an adapter, electrically coupled between the controller and the environment sensor and configured to analyze the at least one environmental physical parameter to output a control signal to the microcontroller for the microcontroller to determine to execute one of the setting modes according to the control signal.

17. The adaptive touch panel system according to claim 16, further comprising:

a hub, coupled to the microcontroller;

a first port, coupled between the adapter and the hub; and a second port, coupled between the hub and an operating system (OS), wherein the hub is configured to transmit the control signal output by the adapter to the microcontroller in a time-sharing manner and transmit the touch data generated by the microcontroller to the OS.

18. The adaptive touch panel system according to claim 15, wherein the controller further comprises:

an adapter, electrically coupled to the environment sensor and configured to analyze the at least one environmental physical parameter to output a control signal to the microcontroller for the microcontroller to determine to execute one of the setting modes according to the control signal.

19. The adaptive touch panel system according to claim 1, wherein the controller is further coupled to an OS, and the at least one environmental physical parameter is output to the OS for the OS to analyze the at least one environmental physical parameter, wherein the OS returns a control signal corresponding to the at least one environmental physical parameter to the controller for the controller to determine to execute one of the setting modes according to the control signal.

20. An adaptive method for a touch panel system, applied to setting of a touch panel system with a touch sensor, comprising:

obtaining at least one environmental physical parameter through an environment sensor;

correspondingly selecting one of a plurality of setting modes according to the at least one environmental physical parameter, and setting the touch sensor according to one of the setting modes, the setting modes comprising a general setting mode and at least one special setting mode;

obtaining touch raw data through the touch sensor; and analyzing the touch raw data according to one of the setting modes to generate touch data, wherein when the selected special setting mode is executed, a touch sensitivity of the touch sensor is adjusted correspondingly according to a result of comparison of the environmental physical parameter and a threshold value.

* * * * *